Hyatt & Hupfel,

Barrel Roller.

No. 113,771. Patented Apr. 18, 1871.

Witnesses:
A. W. Almquist
Wm. H. C. Smith.

Inventors:
L. L. Hyatt.
A. G. Hupfel,
Per
Attorneys.

UNITED STATES PATENT OFFICE.

LEWIS L. HYATT, OF NEW YORK, AND ADOLPH G. HÜPFEL, OF MORRISANIA, N. Y.

IMPROVEMENT IN BARREL-ROLLING APPARATUS.

Specification forming part of Letters Patent No. 113,771, dated April 18, 1871.

*To all whom it may concern:*

Be it known that we, LEWIS L. HYATT, of the city, county, and State of New York, and ADOLPH G. HÜPFEL, of Morrisania, in the county of Westchester and State of New York, have invented a new and useful Improvement in Barrel-Rolling Apparatus; and we do hereby declare that the following is a full, clear, and exact description thereof, which will enable others skilled in the art to make and use the same, reference being had to the accompanying drawings, forming part of this specification, in which—

Figure 1:
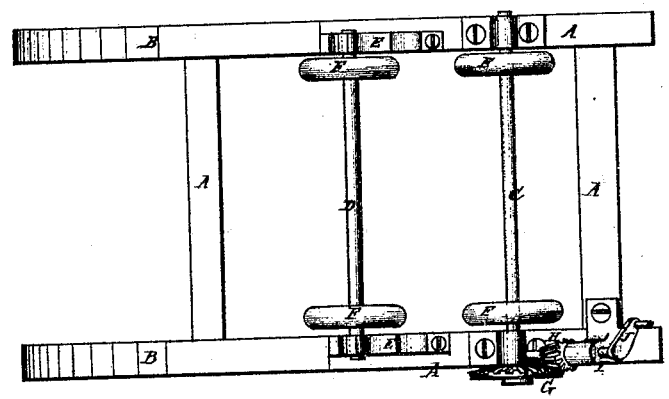
Figure 1:
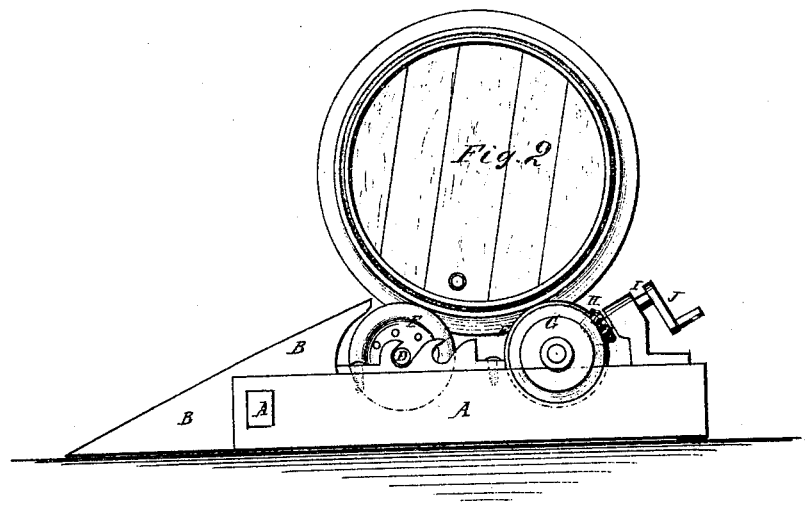

Figure 1 is a top view of our improved apparatus. Fig. 2 is a side view of the same, showing a barrel in place upon it.

Similar letters of reference indicate corresponding parts.

Our invention has for its object to furnish an improved apparatus for rolling barrels which have been coated with pitch or other similar substance to keep the said substance spread over the surface of the barrel until cooled, and which shall be simple in construction, easily operated, and effective in operation; and it consists in the construction and combination of the various parts of the apparatus, as hereinafter more fully described.

A is a rectangular frame, consisting of two side bars connected at their ends by cross-bars. To one end of the frame A are attached two inclined bars, B, the rear ends of which extend upward and inward, and terminate about upon a level with the top of the wheels upon which the barrels are rolled.

C is a shaft the journals of which revolve in bearings attached to the side beams of the frame A, near one end.

D is a shaft the journals of which revolve in bearings E, attached to the side bars of the frame A. The bearings E are blocks having notches formed in them, inclined toward the other shaft, C, so that the pressure of the barrel may hold the shaft D in its bearings. This construction of the bearings E enables the shaft D to be adjusted nearer to or farther from the shaft C, according to the size of the barrel.

To the shafts C and D, near the side bars of the frame A, are attached small wheels F, some of which wheels may be hung eccentrically, if desired. The shafts C D are designed to be of such a length that the wheels F may be upon the opposite sides of the bilge of the barrel.

To one end of the shaft C is attached a gear-wheel, G, into the teeth of which mesh the teeth of the gear-wheel H, attached to a short shaft, I, which revolves in bearings attached to the frame A, and to its end is attached a crank, J, by means of which the shaft C and the wheels F, attached to it, are revolved. The wheels F and shaft D are revolved by the friction of the revolving barrel. The wheels F and shaft D may be kept from revolving while rolling the barrel out of the apparatus by a pin passed through a hole in the wheel F, attached to the shaft D, and which rests against the bearing E.

Having thus described our invention, we claim as new and desire to secure by Letters Patent—

1. An improved barrel-rolling apparatus formed by the combination of the frame A, inclined bars B, shafts C and D, bearings E, whether made with one or more notches, wheels F, gear-wheels G H, shaft I, and crank J, or equivalent, with each other, said parts being constructed and operating substantially as herein shown and described, and for the purpose set forth.

2. The bearings F, constructed as herein shown and described, in combination with the movable or loose shaft of a barrel-rolling apparatus, as and for the purpose set forth.

The above specification of our invention signed by us this 16th day of February, 1871.

LEWIS L. HYATT.
ADOLPH G. HÜPFEL.

Witnesses:
JAMES T. GRAHAM,
GEO. W. MABEE.